US008427469B2

(12) United States Patent
Suh et al.

(10) Patent No.: US 8,427,469 B2
(45) Date of Patent: Apr. 23, 2013

(54) RECEIVING SYSTEM AND METHOD OF PROCESSING DATA

(75) Inventors: Jong Yeul Suh, Seoul (KR); Chul Soo Lee, Seoul (KR); Seung Jong Choi, Seoul (KR); Jung Eun Lim, Seoul (KR); Jeong Hyu Yang, Seoul (KR); Jin Seok Im, Seoul (KR); Wern Bae Kil, Seoul (KR)

(73) Assignee: LG Electronics Inc., Seoul (KR)

( * ) Notice: Subject to any disclaimer, the term of this patent is extended or adjusted under 35 U.S.C. 154(b) by 732 days.

(21) Appl. No.: 12/588,302

(22) Filed: Oct. 9, 2009

(65) Prior Publication Data

US 2010/0225645 A1    Sep. 9, 2010

Related U.S. Application Data

(60) Provisional application No. 61/104,274, filed on Oct. 9, 2009, provisional application No. 61/240,657, filed on Sep. 9, 2009, provisional application No. 61/173,196, filed on Apr. 27, 2009.

(51) Int. Cl.
*G06T 15/00* (2011.01)
(52) U.S. Cl.
USPC ........... 345/419; 345/506; 370/419; 370/475; 382/184
(58) Field of Classification Search ............... 345/419, 345/506; 370/419, 475; 382/164
See application file for complete search history.

(56) References Cited

U.S. PATENT DOCUMENTS

| 7,808,503 B2 * | 10/2010 | Duluk et al. ............... 345/506 |
| 7,929,560 B2 * | 4/2011 | Morioka .................... 370/419 |
| 8,045,588 B2 * | 10/2011 | Lee et al. .................. 370/475 |
| 8,165,391 B2 * | 4/2012 | Kajita et al. ............... 382/164 |
| 2007/0011720 A1 | 1/2007 | Min |

FOREIGN PATENT DOCUMENTS

| EP | 1 587 330 A1 | 10/2005 |
| JP | 2000-078611 | 3/2000 |
| KR | 10-2006-0054872 | 5/2006 |
| KR | 10-2007-0061227 | 6/2007 |
| WO | WO 2007/067020 A1 | 6/2007 |
| WO | WO 2008/054100 A1 | 5/2008 |

* cited by examiner

*Primary Examiner* — Phu K Nguyen
(74) *Attorney, Agent, or Firm* — McKenna Long & Aldridge LLP

(57) ABSTRACT

A receiving system that can receive and process 3D images and a data processing method of the same are disclosed. The receiving system includes an image receiving unit and a display unit. The image receiving unit receives a 3-dimensions (3D) image and system information including additional information of the 3D image (i.e., additional 3D image information), generates 3D signaling information based upon the additional 3D image information included in the system information, and transmits the generated 3D signaling information along with the 3D image through a digital interface. And, the display unit receives the 3D signaling information along with the 3D image through the digital interface, formats the 3D image based upon the receiving 3D signaling information, and displays the formatted 3D image.

12 Claims, 12 Drawing Sheets

FIG. 3

| Syntax | # of bit |
|---|---|
| TS_Program_map_section(){ | |
|     table_id | 8 |
|     section_syntax_indicator | 1 |
|     '0' | 1 |
|     reserved | 2 |
|     section_length | 12 |
|     program_number | 16 |
|     reserved | 2 |
|     version_number | 5 |
|     current_next_indicator | 1 |
|     section_number | 8 |
|     last_section_number | 8 |
|     reserved | 3 |
|     program_info_length | 12 |
|     for(i=0i<N;i++){ | |
|       descriptor() | |
|     } | |
|     for(i=0;i<N1;i++){ | |
|       stream_type | 8 |
|       reserved | 3 |
|       elementary_PID | 13 |
|       reserved | 4 |
|       ES_info_length | 12 |
|       for(i=0;i<N2;i++){ | |
|         descriptor() | |
|       } | |
|     } | |
|     CRC32 | 32 |
| } | |

| Syntax | No. of bits | Format |
|---|---|---|
| stereoscopic_video_format_descriptor ( ) { | | |
|     descriptor_tag | 8 | 0xTBD |
|     descriptor_length | 8 | uimsbf |
|     service_type | 8 | uimsbf |
|     composition_type | 8 | uimsbf |
|     reserved | 4 | '1111' |
|     LR_first_flag | 1 | bslbf |
|     spatial_flipping_flag | 1 | bslbf |
|     image0_flipped_flag | 1 | bslbf |
|     quincunx_filtering_flag | 1 | bslbf |
| } | | |

FIG. 7

| Packet type value | Packet type |
|---|---|
| 0x00 | Null |
| 0x01 | Audio clock regeneration (N/CTS) |
| 0x02 | Audio sample (L-PCM and IEC 61937 compressed formats) |
| 0x03 | General control |
| 0x04 | ACP Packet |
| 0x05 | ISRC1 Packet |
| 0x06 | ISRC2 Packet |
| 0x07 | One bit audio sample packet |
| 0x08 | DST audio packet |
| 0x09 | High Bitrate (HBR) audio stream packet (IEC 61937) |
| 0x0A | Gamut metadata packet |
| 0x80+InfoFrame type | InfoFrame packet |
| 0x81 | Vendor-specific InfoFrame |
| 0x82 | AVI InfoFrame |
| 0x83 | Source product descriptor InfoFrame |
| 0x84 | Audio InfoFrame |
| 0x85 | MPEG Source InfoFrame |

FIG. 8

| Byte / Bit # | 7 | 6 | 5 | 4 | 3 | 2 | 1 | 0 |
|---|---|---|---|---|---|---|---|---|
| HB0 | Packet type = 0x82 ||||||||
| HB1 | Version = 0x02 ||||||||
| HB2 | 0 | 0 | 0 | Length = 13 (0x0D) |||||

FIG. 9

| Packet Byte # | CEA-861-D Byte # | 7 | 6 | 5 | 4 | 3 | 2 | 1 | 0 |
|---|---|---|---|---|---|---|---|---|---|
| PB0 | N.A. | | | | Checksum | | | | |
| PB1 | Data byte 1 | Rsvd (0) | Y1 | Y0 | A0 | B1 | B0 | S1 | S0 |
| PB2 | Data byte 2 | C1 | C0 | M1 | M0 | R3 | R2 | R1 | R0 |
| PB3 | Data byte 3 | ITC | EC2 | EC1 | EC0 | Q1 | Q0 | SC1 | SC0 |
| PB4 | Data byte 4 | Rsvd (0) | VIC6 | VIC5 | VIC4 | VIC3 | VIC2 | VIC1 | VIC0 |
| PB5 | Data byte 5 | | Reserved (0) | | | PR3 | PR2 | PR1 | PR0 |
| PB6 | Data byte 6 | Line Number of End of Top Bar (lower 8 bits) | | | | | | | |
| PB7 | Data byte 7 | Line Number of End of Top Bar (upper 8 bits) | | | | | | | |
| PB8 | Data byte 8 | Line Number of Start of Bottom Bar (lower 8 bits) | | | | | | | |
| PB9 | Data byte 9 | Line Number of Start of Bottom Bar (upper 8 bits) | | | | | | | |
| PB10 | Data byte 10 | Pixel Number of End of Left Bar (lower 8 bits) | | | | | | | |
| PB11 | Data byte 11 | Pixel Number of End of Left Bar (upper 8 bits) | | | | | | | |
| PB12 | Data byte 12 | Pixel Number Start of Right Bar(lower 8 bits) | | | | | | | |
| PB13 | Data byte 13 | Pixel Number Start of Right Bar(upper 8 bits) | | | | | | | |
| PB14 - PB27 | n. a. | Reserved (0) | | | | | | | |

FIG. 10

| Packet Byte # | CEA-861-D Btye # | 7 | 6 | 5 | 4 | 3 | 2 | 1 | 0 |
|---|---|---|---|---|---|---|---|---|---|
| PB0 | N. A. | | | | Checksum | | | | |
| PB1 | Data byte 1 | Rsvd (0) | Y1 | Y0 | A0 | B1 | B0 | S1 | S0 |
| PB2 | Data byte 2 | C1 | C0 | M1 | M0 | R3 | R2 | R1 | R0 |
| PB3 | Data byte 3 | ITC | EC2 | EC1 | EC0 | Q1 | Q0 | SC1 | SC0 |
| PB4 | Data byte 4 | Rsvd (0) | VIC6 | VIC5 | VIC4 | VIC3 | VIC2 | VIC1 | VIC0 |
| PB5 | Data byte 5 | | Reserved (0) | | | PR3 | PR2 | PR1 | PR0 |
| PB6 | Data byte 6 | Line Number of End of Top Bar (lower 8 bits) | | | | | | | |
| PB7 | Data byte 7 | Line Number of End of Top Bar (upper 8 bits) | | | | | | | |
| PB8 | Data byte 8 | Line Number of Start of Bottom Bar (lower 8 bits) | | | | | | | |
| PB9 | Data byte 9 | Line Number of Start of Bottom Bar (upper 8 bits) | | | | | | | |
| PB10 | Data byte 10 | Pixel Number of End of Left Bar (lower 8 bits) | | | | | | | |
| PB11 | Data byte 11 | Pixel Number of End of Left Bar (upper 8 bits) | | | | | | | |
| PB12 | Data byte 12 | Pixel Number Start of Right Bar(lower 8 bits) | | | | | | | |
| PB13 | Data byte 13 | Pixel Number Start of Right Bar(upper 8 bits) | | | | | | | |
| PB14 | Data byte 14 | SV | CT2 | CT1 | CT0 | OR | FL1 | FL0 | QS |
| PB15 - PB27 | n. a. | | | | Reserved (0) | | | | |

FIG. 11

| SV | 2D/3D Service |
|---|---|
| 0 | 2D |
| 1 | 3D |

(a)

| CT2 | CT1 | CT0 | Composition Type |
|---|---|---|---|
| 0 | 0 | 0 | Top-Bottom |
| 0 | 0 | 1 | Side-by-Side |
| 0 | 1 | 0 | Checkerboard |
| 0 | 1 | 1 | Frame-sequential |
| 1 | 0 | 0 | Interlaced |
| 1 | 0 | 1 | Anaglyph |
| 1 | 1 | 0 | Full left/right |
| 1 | 1 | 1 | Full left/Half right |

(b)

| OR | Left/Right Ordering |
|---|---|
| 0 | Left first |
| 1 | Right first |

(c)

| FL1 | FL0 | Spatial Flipping |
|---|---|---|
| 0 | x | No |
| 1 | 0 | Image1 flipped |
| 1 | 1 | Image0 flipped |

(d)

| QS | Quincunx Filtering |
|---|---|
| 0 | No |
| 1 | Yes |

(e)

RECEIVING SYSTEM AND METHOD OF PROCESSING DATA

This application claims the benefit of U.S. Provisional Application Nos. 61/104,274 filed on Oct. 9, 2009; 61/240, 657 filed on Sep. 9, 2009 and 61/173,196 filed on Apr. 27, 2009, which is hereby incorporated by reference as if fully set forth herein.

BACKGROUND OF THE INVENTION

1. Field of the Invention

The present invention relates to a method and device for processing an image signal and, more particularly, to a receiving system for receiving and processing a 3-dimensional (3D) image signal and a method of processing data.

2. Discussion of the Related Art

Generally, a 3-dimensional (3D) image (or stereoscopic image) is based upon the principle of stereoscopic vision of both human eyes. A parallax between both eyes, in other words, a binocular parallax caused by the two eyes of an individual being spaced apart at a distance of approximately 65 millimeters (mm) is viewed as the main factor that enables the individual to view objects 3-dimensionally. When each of the left eye and the right eye respectively views a 2-dimensional (or flat) image, the brain combines the pair of differently viewed images, thereby realizing the depth and actual form of the original 3D image.

Such 3D image display may be broadly divided into a stereoscopic method, a volumetric method, and a holographic method. Furthermore, the method of displaying 3D images may be broadly divided into a method of wearing special glasses and a method of not wearing any special glasses.

SUMMARY OF THE INVENTION

Accordingly, the present invention is directed to a receiving system and a method of processing data that substantially obviate one or more problems due to limitations and disadvantages of the related art.

An object of the present invention is to provide a receiving system and a method for processing data that can identify the reception of a 3D image and process the received 3D image.

Another object of the present invention is to provide a receiving system and a method for processing data that can supply additional information associated to 3D images, which are included in and received via system information, to a display device connected to a digital interface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a receiving system includes an image receiving unit and a display unit. Herein, the image receiving unit may also be referred to as a decoding device (or an HDMI source), and the display unit may also be referred to as a display device (or an HDMI sink). More specifically, the image receiving unit receives a 3-dimensions (3D) image and system information including additional information of the 3D image (i.e., additional 3D image information), generates 3D signaling information based upon the additional 3D image information included in the system information, and transmits the generated 3D signaling information along with the 3D image through a digital interface. And, the display unit receives the 3D signaling information along with the 3D image through the digital interface, formats the 3D image based upon the receiving 3D signaling information, and displays the formatted 3D image.

Herein, the additional 3D image information may be included in a program map table (PMT) of the system information in a descriptor format, thereby being received. The additional 3D image information may include a field indicating whether the 3D image is being received, a field indicating a transmission format of the 3D image, a field indicating whether an uppermost pixel of a left-end portion within the received image frame belongs to a left image or to a right image, a field indicating whether at least one of the left image and the right image has been inversely scanned and encoded, a field indicating which one of the left image and the right image has been inversely scanned, and a field indicating whether at least one of the left image and the right image has been sampled by using a filter.

The HDMI source may insert and transmit the 3D signaling information generated from the additional 3D image information in an AVI InfoFrame packet. Furthermore, the AVI InfoFrame packet may comprises of a header and a contents region, and one or more fields may be assigned to at least one byte of the contents region, thereby recording the 3D signaling information. Also, at least one byte of the contents region in the AVI InfoFrame packet may include a field indicating whether the 3D image is being received, a field indicating a transmission format of the 3D image, a field indicating whether an uppermost pixel of a left-end portion within the received image frame belongs to a left image or to a right image, a field indicating whether at least one of the left image and the right image has been inversely scanned, a field indicating which one of the left image and the right image has been inversely scanned, and a field indicating whether at least one of the left image and the right image has been sampled by using a filter.

In another aspect of the present invention, a data processing method in a receiving system includes receiving a 3-dimensions (3D) image and system information including additional information of the 3D image (i.e., additional 3D image information), generating 3D signaling information based upon the additional 3D image information included in the system information, and transmitting the generated 3D signaling information along with the 3D image through a digital interface, and receiving the 3D signaling information along with the 3D image through the digital interface, formatting the 3D image based upon the receiving 3D signaling information, and displaying the formatted 3D image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a PMT syntax structure, wherein identification information that can identify the reception of a 3D image is included in a descriptor format, according to an embodiment of the present invention;

FIG. 7 illustrates a table showing example of diverse packet types being used in an HDMI standard according to the present invention;

FIG. 8 illustrates an exemplary header structure of an AVI InfoFrame packet according to the embodiment of the present invention;

FIG. 9 illustrates a content structure of a general AVI InfoFrame packet according to the embodiment of the present invention;

FIG. 10 illustrates a content structure of an AVI InfoFrame packet according to the embodiment of the present invention;

Figure 12:
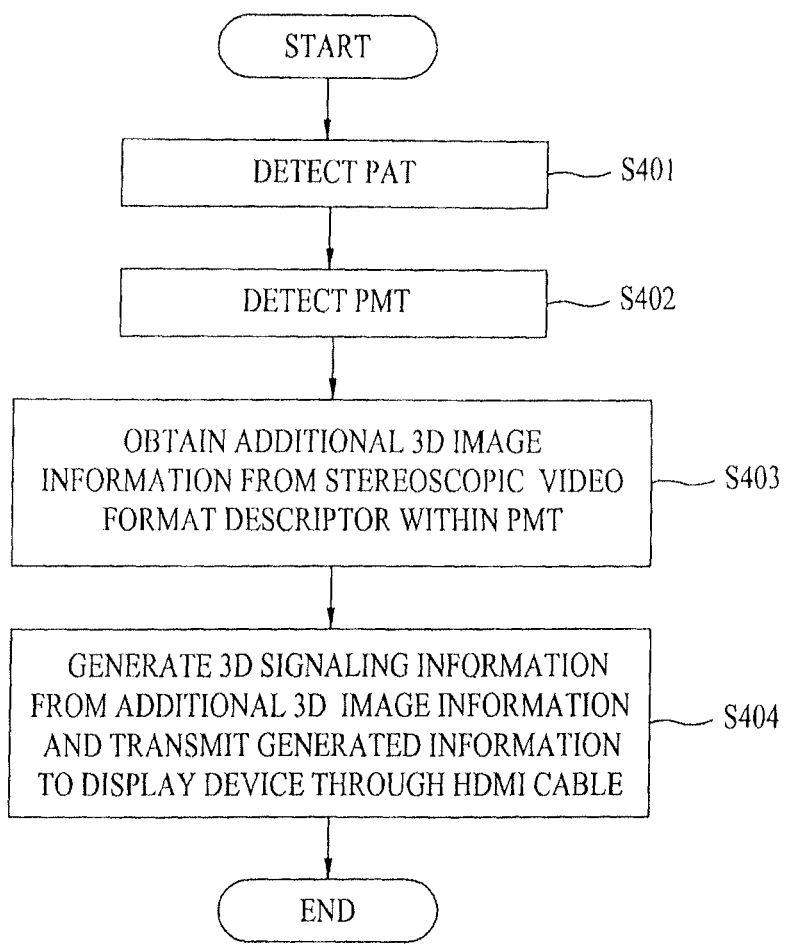
Figure 13:
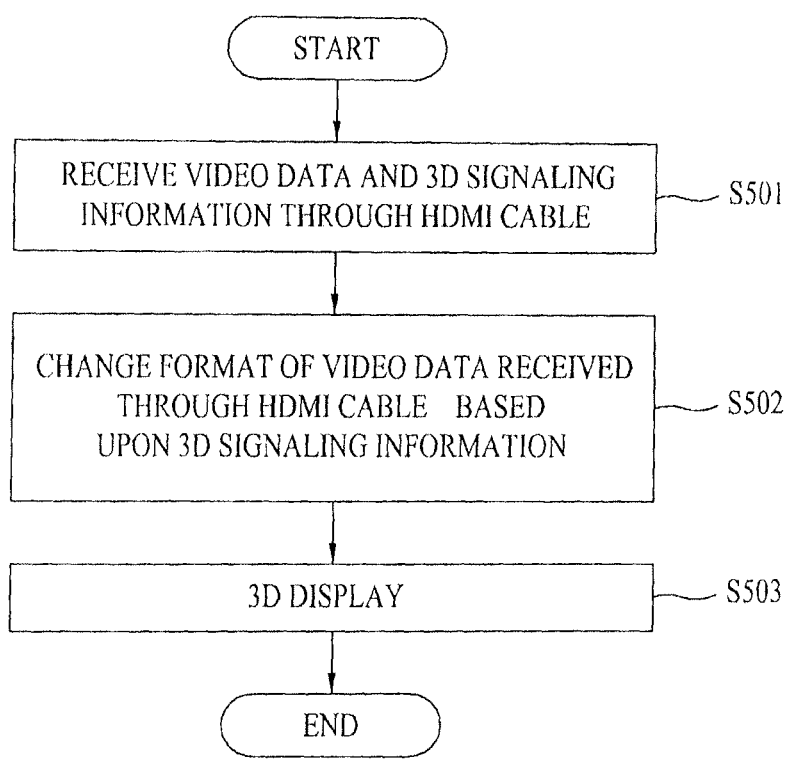

(a) to (e) of FIG. 11 respectively illustrate a table indicating the meaning of values assigned to each field within the $15^{th}$ byte of the AVI InfoFrame packet according to the embodiment of the present invention;

FIG. 12 illustrates a flow chart showing process steps for generating and transmitting 3D signaling information according to the embodiment of the present invention; and FIG. 13 illustrates a flow chart showing process steps for processing video data by referring to the 3D signaling information and displaying the processed video data as a 3D image according to the embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention relates to a receiving system that can recognize the reception of a 3D image and that can process the received 3D image. According to the embodiment of the present invention, a transmitting system of the present invention includes supplemental (or additional) information on the 3D image in system information and transmits the supplemental information.

The present invention also relates to using the supplemental information on the 3D image included in the system information and received by the receiving system, so as to decode the 3D image.

The present invention also relates to generating 3D signaling information from additional information of the 3D image (or additional 3D image information), which is included in the system information and received, thereby providing the generated 3D signaling information to a display device connected to a digital interface.

Finally, the present invention relates to having the display device process 3D images based upon the 3D signaling information, which is provided through the digital interface, thereby displaying the processed 3D images.

Herein, 3D images may include stereo (or stereoscopic) images, which take into consideration two different perspectives (or viewpoints), and multi-view images, which take into consideration three different perspectives.

A stereo image refers to a pair of left and right images acquired by photographing the same subject with a left-side camera and a right-side camera, wherein both cameras are spaced apart from one another at a predetermined distance. Furthermore, a multi-view image refers to a set of at least 3 images acquired by photographing the same subject with at least 3 different cameras either spaced apart from one another at predetermined distances or placed at different angles. Although the stereo (or stereoscopic) image has been described as an embodiment of the present invention, it is apparent that multi-view images may also be applied to the present invention.

The transmission formats of stereo images include a single video stream format and a multi-video stream format.

Figure 1:
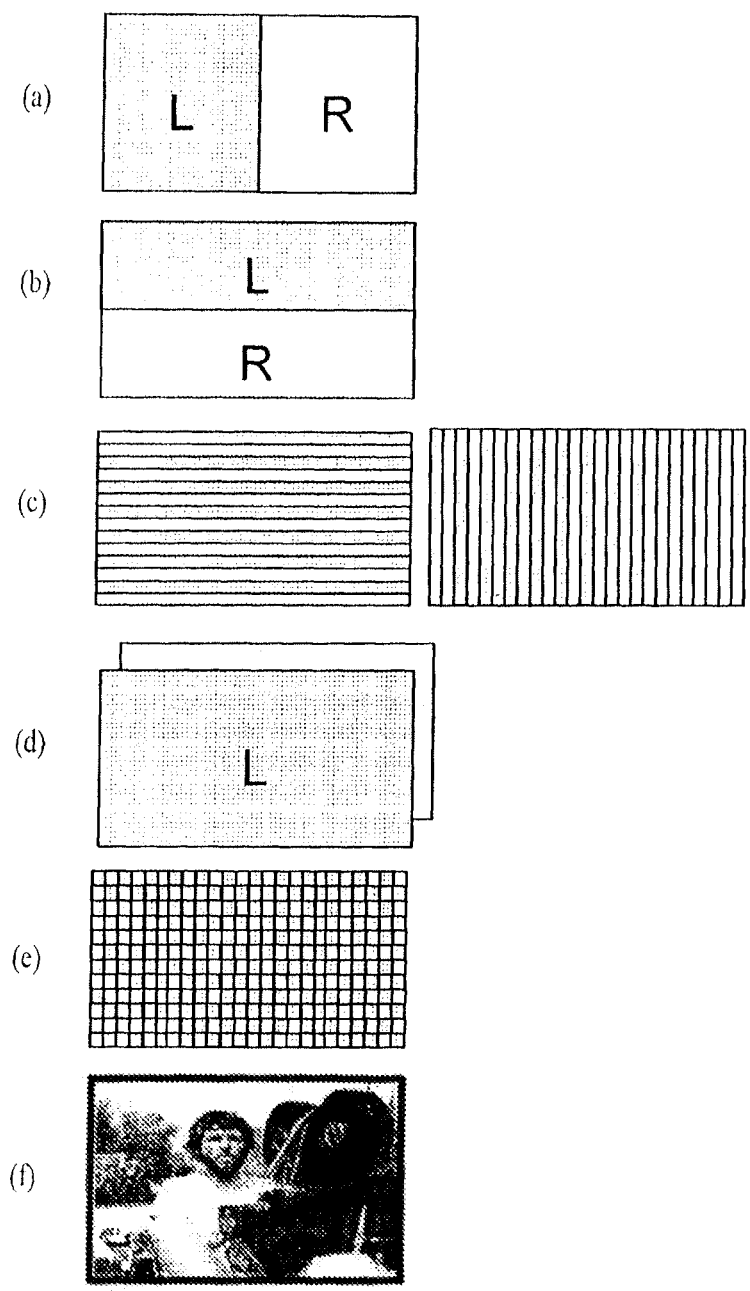
FIG. 1 illustrates examples of a single video stream format among transmission formats for 3D images according to the present invention.

Herein, the single video stream format includes a side-by-side format shown in (a) of FIG. 1, a top/down format shown in (b) of FIG. 1, an interlaced format shown in (c) of FIG. 1, a frame sequential format shown in (d) of FIG. 1, a checker board format shown in (e) of FIG. 1, and an anaglyph format shown in (f) of FIG. 1.

Figure 2:
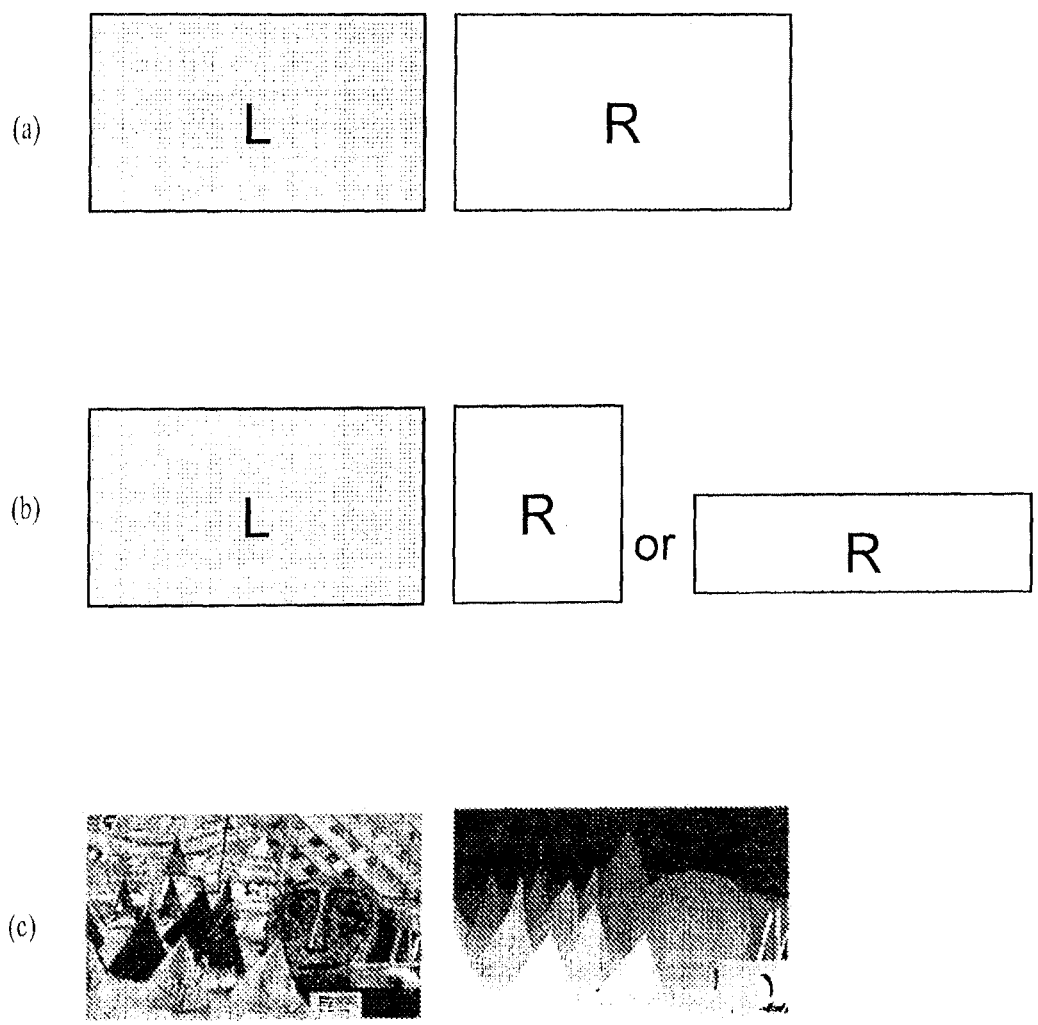
FIG. 2 illustrates examples of a multiple video stream format among transmission formats for 3D images according to the present invention.

Also, the multi-video stream format includes a full left/right format shown in (a) of FIG. 2, a full left/half right format shown in (b) of FIG. 2, and a 2D video/depth format shown in (c) of FIG. 2.

For example, the side-by-side format shown in (a) of FIG. 1 corresponds to a case where a left image and a right image are ½ sub-sampled in a horizontal direction. Herein, the sampled left image is positioned on the left side, and the sampled right image is positioned on the right side, thereby creating a single stereo image. The top/down format shown in (b) of FIG. 1 corresponds to a case where a left image and a right image are ½ sub-sampled in a vertical direction. Herein, the sampled left image is positioned on the upper side, and the sampled right image is positioned on the lower side, thereby creating a single stereo image. The interlaced format shown in (c) of FIG. 1 corresponds to a case where a left image and a right image are ½ sub-sampled in a horizontal direction. Herein, pixels of the sampled left image and pixels of the sampled right image are alternated line by line, thereby creating a single stereo image. Alternatively, a left image and a right image are ½ sub-sampled in a horizontal direction, and pixels of the sampled left image and pixels of the sampled right image are alternated pixel by pixel (i.e., in single pixel units), thereby creating a single stereo image. The checker board format shown in (e) of FIG. 1 corresponds to a case where a left image and a right image are ½ sub-sampled in both horizontal and vertical directions. Herein, pixels of the sampled left image and pixels of the sampled right image are alternated in single pixel units, thereby creating a single stereo image.

Furthermore, the full left/right format shown in (a) of FIG. 2 corresponds to a case where a left image and a right image are sequentially transmitted. The full left/half right format shown in (b) of FIG. 2 corresponds to a case where the left image remains in its original state, and where the right image is ½ sub-sampled either in a horizontal direction or in a vertical direction. Finally, the 2D video/depth format shown in (c) of FIG. 2 corresponds to a case where one of the left image and the right image is transmitted, and where depth information for creating another image is also transmitted at the same time.

Also, in case of the receiving system corresponds to a system that can process 3D images, the receiving system should be able to recognize the reception of a 3D image. Furthermore, since 3D images may be transmitted in diverse transmission formats, the receiving system should also be informed of the receiving format of the 3D image so as to be able to recover the 3D image to its initial (or original image). According to an embodiment of the present invention, in order to do so, the transmitting system of the present invention should include additional information on the 3D image (or additional 3D image information) in the system information, when transmitting the system information. According to the embodiment of the present invention, the receiving system of the present invention uses the additional 3D image information included in the received system information, thereby decoding the received 3D image and displaying the decoded 3D image.

In some cases, the system information may also be referred to as service information. Herein, the system information may include channel information, program information, event information, and so on.

According to the embodiment of the present invention, a program specific information/program and system information protocol (PSI/PSIP) is adopted as the system information. However, the present invention will not be limited only to this example. In other words, any protocol that transmits system information in a table format may be applied in the present invention regardless of the name of the corresponding protocol.

The PSI table is an MPEG-2 system standard defined for dividing (or categorizing) channels and programs. The PSIP table is an advanced television systems committee (ATSC) standard that can enable the division (or identification or categorization) of the channels and the programs. According to an embodiment of the present invention, the PSI table may include a program association table (PAT), a conditional access table (CAT), a program map table (PMT), and a network information table (NIT).

Herein, the PAT corresponds to special information that is transmitted by a data packet having a PID of '0'. The PAT transmits PID information of the corresponding PMT and PID information of the corresponding NIT for each program. The CAT transmits information on a paid broadcasting system used by a transmitting system. The PMT transmits PID information of a transport stream (TS) packet, in which program identification numbers and individual bit sequences of video and audio data configuring the corresponding program are transmitted, and also transmits the PID information in which PCR is transmitted. The NIT transmits information of the actual transmission network. For example, by parsing a PAT table having the PID of '0', a program number and a PID of the PMT may be found (or acquired). Then, by parsing the PMT acquired from the PAT, the correlation between the elements configuring the corresponding program may also be acquired (or found).

According to an embodiment of the present invention, the PSIP table may include a virtual channel table (VCT), a system time table (STT), a rating region table (RRT), an extended text table (ETT), a direct channel change table (DCCT), an event information table (EIT), and a master guide table (MGT).

The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and channel number. The STT transmits information on the current data and timing information. The RRT transmits information on region and consultation organs for program ratings. The ETT transmits additional description of a specific channel and broadcast program. The EIT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

According to an embodiment of the present invention, the additional 3D image information may be included in the system information, so as to be received, in at least one or more descriptor format or field format.

Also, according to an embodiment of the present invention, the additional 3D image information may be included in a PMT within the system information in a descriptor format, so as to be received.

Furthermore, according to an embodiment of the present invention, the additional 3D image information may also be included in a VCT within the system information in a descriptor format, so as to be received.

The additional 3D image information may include at least one or more information associated to the 3D image. The additional 3D image information may also include information indicating the transmission format of the 3D image, information indicating whether the received image corresponds to a 2D image or a 3D image, information indicating whether the uppermost pixel of the left-end portion within the received image frame belongs to a left image or to a right image, information indicating whether at least one of the left image and the right image has been inversely scanned and encoded, information indicating which one of the left image and the right image has been inversely scanned, and information indicating whether at least one of the left image and the right image has been sampled by using a filter.

FIG. 3 illustrates a PMT syntax structure including additional 3D image information in a descriptor format according to an embodiment of the present invention.

Referring to FIG. 3, a table_id field corresponds to a table identifier. Herein, an identifier that identifies the PMT may be set as the table_id field.

A section_syntax_indicator field corresponds to an indicator defining a section format of the PMT.

A section_length field indicates the section length of the PMT.

A program_number field corresponds to information matching with the PAT. Herein, the program_number field indicates the number of the corresponding program.

A version_number field indicates a version number of the PMT.

A current_next_indicator field corresponds to an indicator indicating whether the current table section is applicable or not.

A section_number field indicates the section number of the current PMT section, when the PMT is divided into at least one or more sections, thereby being transmitted.

A last_section_number field indicates the last section number of the corresponding PMT.

A PCR_PID field indicates the PID of a packet that delivers a program clock reference (PCR) of the current program.

A program_info_length field indicates length information of a descriptor immediately following the program_info_length field in number of bytes. More specifically, the program_info_length field indicates the length of each descriptor included in the first loop.

A stream_type field indicates a type of element stream and encoding information included in a packet having the PID value marked in an elementary_PID field that follows. For example, according to an embodiment of the present invention, if the corresponding stream is an MPEG-2-encoded video stream, the stream_type field value may be marked to have a value of '0x02'.

The elementary_PID field indicates an identifier of the element stream, i.e., the PID value of a packet including the corresponding element stream. For example, if the stream_type field value is equal to '0x02', the elementary_PID field indicates a PID of an MPEG-2-encoded video ES.

An ES_info_length field indicates the length information of a descriptor immediately following the ES_info_length field in number of bytes. More specifically, the ES_info_length field indicates the length of each descriptor included in the second loop.

According to the present invention, descriptors of a program level are included in the descriptor( ) region within the first loop of the PMT, and descriptors of a stream level are included in the descriptor( ) region within the second loop of the PMT. More specifically, the descriptors included in the first loop correspond to descriptors that are individually applied to each program, and the descriptors included in the second loop correspond to descriptors that are individually applied to each ES.

According to an embodiment of the present invention, if a program corresponding to the program_number field value of the PMT is a 3D image, i.e., a 3D content, additional 3D image information is included in a descriptor( ) region of the second loop within the PMT in a descriptor format. In the description of the present invention, the above-described descriptor will be referred to as a stereoscopic video format descriptor stereoscopic_video_format_descriptor( ). For example, when the elementary_PID field value indicates the PID of the video ES, the stereoscopic video format descriptor stereoscopic_video_format_descriptor( ) is included after the ES_Info_length field. The stereoscopic video format descriptor stereoscopic_video_format_descriptor( ) may also be included in the first loop of the PMT.

More specifically, in the receiving system, if the stereoscopic video format descriptor is included in the second loop of the PMT, thereby being received, the stereoscopic video format descriptor is parsed so as to obtain the additional 3D image information.

Figures 4, 5:
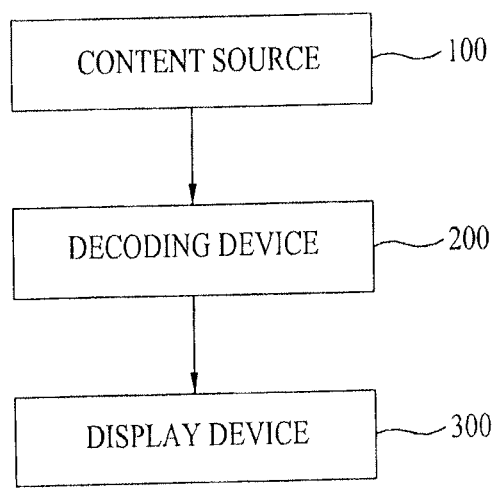
FIG. 4 illustrates a syntax structure of a stereoscopic video format descriptor according to the embodiment of the present invention.
FIG. 5 illustrates a schematic view of a 3D image system according to the embodiment of the present invention.

FIG. 4 illustrates a syntax structure of the stereoscopic video format descriptor stereoscopic_video_format_descriptor( ) according to an embodiment of the present invention.

Herein, a descriptor_tag field is assigned with 8 bits and indicates that the corresponding descriptor is stereoscopic_video_format_descriptor( ).

A descriptor_length field is an 8-bit field, which indicates the byte size (or length) starting from the end of the descriptor_length field to the end of the stereoscopic_video_format_descriptor( ).

A service_type field corresponds to an 8-bit field, which indicates whether the video ES indicates by the stream_type field corresponds to the video ES of a 2D image or the video ES of a 3D image. According to the embodiment of the present invention, if the video ES corresponds to the video ES of a 2D image, the service_type field value is marked as '0'. Alternatively, if the video ES corresponds to the video ES of a 3D image, the service_type field value is marked as '1'.

A composition_type field corresponds to an 8-bit field, which indicates by which transmission format the corresponding 3D content has been received.

Herein, the composition_type field indicates by which of the transmission formats, i.e., the side-by-side format, the top/bottom format, the interlaced format, the frame sequential format, the checker board format, the anaglyph format, the full left/right format, the full left/half right format, and the 2D video/depth format, the corresponding 3D image has been received. For example, when the composition_type field value is equal to '0x01', the receiving system determines that the corresponding 3D image has been received in a side-by-side format.

An LR_first_flag field indicates, when generating a stereo image (or when multiplexing a stereo image), whether the uppermost pixel of the furthermost left side of the frame belongs to the left image, or whether the uppermost pixel of the furthermost left side of the frame belongs to the right image. More specifically, the LR_first_flag field indicates whether to display the furthermost left side of the received frame as the left image, or whether to display the furthermost left side of the received frame as the right image. According to an embodiment of the present invention, if the value of the LR_first_flag field is equal to '0', the furthermost left side of the frame is displayed as the left image. And, if the value of the LR_first_flag field is equal to '1', the furthermost left side of the frame is displayed as the right image.

For example, when the transmission format is a side-by-side format, and if the value of the LR_first_flag field is equal to '0', the receiving system decodes the pixels of the left-side half of a frame and displays the decoded pixels as the left image. And, the receiving system decodes the pixels of the right-side half of the frame and displays the decoded pixels as the right image. Conversely, when the transmission format is a side-by-side format, and if the value of the LR_first_flag field is equal to '1', the receiving system decodes the pixels of the left-side half of a frame and displays the decoded pixels as the right image. And, the receiving system decodes the pixels of the right-side half of the frame and displays the decoded pixels as the left image.

As another example, when the transmission format is a top/bottom format, and if the value of the LR_first_flag field is equal to '0', the receiving system decodes the pixels of the upper half of a frame and displays the decoded pixels as the left image. And, the receiving system decodes the pixels of the lower half of the frame and displays the decoded pixels as the right image. Conversely, when the transmission format is a top/bottom format, and if the value of the LR_first_flag field is equal to '1', the receiving system decodes the pixels of the upper half of a frame and displays the decoded pixels as the right image. And, the receiving system decodes the pixels of the lower half of the frame and displays the decoded pixels as the left image.

A spatial_flipping_flag field indicates whether at least one of the left image and the right image is inversely scanned and encoded. When the transmitting system encodes a stereo image consisting of a left image and a right image, the transmitting system scans the image by inversing (or flipping) the scanning direction of at least one of the left and right images, so as to enhance the coding efficiency. More specifically, depending upon the scanning efficiency, inverse scanning (or alignment) may be performed on the left or right image in a vertical or horizontal direction. The inversely-scanned images will hereinafter be referred to as mirrored images for simplicity.

According to an embodiment of the present invention, when the transmission format is a side-by-side format, the present invention performs inverse scanning on the left or right image in a horizontal direction, thereby encoding the inversely-scanned image. And, when the transmission format is a top/bottom format, the present invention performs inverse scanning on the left or right image in a vertical direction, thereby encoding the inversely-scanned image. According to the embodiment of the present invention, in this case, the spatial_flipping_flag field is marked to have the value of '1'. If the spatial_flipping_flag field value is equal to '1', prior to displaying the mirrored images, the received system inversely aligns the mirrored images in the initial (or original) scanning order, thereby displaying the aligned images. On the other hand, when the spatial_flipping_flag field value is equal to '0', this indicates that the pixels of the left and right image are aligned in the initial scanning order, thereby being encoded.

When the spatial_flipping_flag field value is equal to '1', an image0_flipped_flag field indicates which image has been flipped (or mirrored or inverted). According to the embodiment of the present invention, if image0 is flipped, then the image0_flipped_flag field value is equal to '1'. And, if image1 is flipped, the image0_flipped_flag field is equal to '0'. Herein, image0 corresponds to an image having the uppermost pixel of the furthermost left side of a frame, which consists of left and right images, belonging thereto. And, image1 corresponds to the other image. More specifically, the mapping relation between image0 and image1 and the left or right image is set based upon the LR_first_flag field. If the LR_first_flag field is equal to '0', the left image corresponds to image0, and the right image corresponds to image1.

A quincunx_filtering_flag field indicates whether a quincunx filter has been used to perform sampling, when generating the stereo image.

According to an embodiment of the present invention, when the transmitting system samples a left image or a right image to a half-resolution image, and if the quincunx filter has been used for the sampling process, the quincunx_filtering_flag field is marked to have the value of '1'. Otherwise, the quincunx_filtering_flag field is marked to have the value of '0'. Herein, if the quincunx_filtering_flag field is equal to '1', the receiving system performs an inverse process of quincunx filtering on the corresponding image.

For example, in case of the side-by-side format, the top/bottom format, and the full left/half right format, when ½-sub-sampling the left or right image in a horizontal or vertical direction, and if the quincunx filter has been used, the quincunx_filtering_flag field is marked to have the value of '1'

According to another embodiment of the present invention, in case of the side-by-side format, the top/bottom format, and the full left/half right format, when ½-sub-sampling the left or right image in a horizontal or vertical direction, a filter other than the quincunx filter may be used. For this case, the present invention may further include a field indicating the type of filter.

As described above, when the receiving system supports a transmission format indicated by the composition_type field value within the stereoscopic video format descriptor stereoscopic_video_format_descriptor( ), the system refers to other fields within the stereoscopic_video_format_descriptor( ) so as to decode the corresponding 3D image and to display the decoded image.

The order, position, and definition of the fields allocated to the stereoscopic video format descriptor stereoscopic_video_format_descriptor( ) shown in FIG. 4, are merely examples presented to facilitate and simplify the understanding of the present invention. In other words, the order, position, and definition of the fields allocated to the stereoscopic video format descriptor stereoscopic_video_format_descriptor( ) and the number of fields that can be additionally allocated thereto may be easily altered or modified by the system designer. Therefore, the present invention will not be limited to the examples given in the above-described embodiment of the present invention.

Herein, the additional 3D image information according to the present invention, i.e., the stereoscopic video format descriptor of FIG. 4 may be included in a virtual channel table (VCT) and received.

FIG. 5 illustrates a block view showing the structure of a 3D imaging system according to the present invention. Herein, the 3D imaging system includes a content source 100, a decoding device 200, and a display device 300. In the description of the present invention, the decoding device 200 and the display device 300 will be collectively referred to as a receiving system, for simplicity.

More specifically, the content source 100 includes 3D contents for the 3D image. Examples of the content source 100 may include a disk, a server, a terrestrial/satellite/cable broadcasting station.

The decoding device 200 receives content from the content source 100 and decodes the received content, thereby creating an image suitable for display. For example, if the received content is compression-encoded, the decoding device 200 performs decompression and/or interpolation, thereby recovering the received content (or image) back to its initial state prior to being compression-encoded. Examples of the decoding device 200 may include a DVD player, a settop box, digital TV, and so on.

The display device 300 displays the image created in the decoding device 200 either in a 2-dimensional (2D) format or in a 3-dimensional (3D) format. Examples of the display device 300 may include a screen, a monitor, a projector, and so on.

Furthermore, the display device 300 may also correspond to a device that can display general 2D images, a device that can display 3D images requiring special viewing glasses, a device that can display 3D images without requiring any special viewing glasses, and so on.

More specifically, by using at least two images based upon the characteristics of the display device 300, the receiving system creates and displays a 3D image using a variety of methods. For example, the display method may include a method of wearing special glasses, and a method of not wearing any glasses.

The method of wearing special glasses is then divided intro a passive method and an active method. The passive method corresponds to a method of showing the 3D image by differentiating the left image and the right image using a polarizing filter. More specifically, the passive method corresponds to a method of wearing a pair of glasses with one red lens and one blue lens fitted to each eye, respectively. The active method corresponds to a method of differentiating the left image and the right image by sequentially covering the left eye and the right eye at a predetermined time interval. More specifically, the active method corresponds to a method of periodically repeating a time-split (or time-divided) and viewing the corresponding image through a pair of glasses equipped with electronic shutters which are synchronized with the time-split cycle period of the image. The active method may also be referred to as a time-split method or a shuttered glass method.

The most well-known methods of not wearing any glasses include a lenticular method and a parallax barrier method. Herein, the lenticular method corresponds to a method of fixing a lenticular lens panel in front of an image panel, wherein the lenticular lens panel is configured of a cylindrical lens array being vertically aligned. The parallax method corresponds to a method of providing a barrier layer having periodic slits above the image panel.

At this point, the decoding device 200 and the display device 300 of the receiving system may be implemented as separate bodies or may be incorporated into a single body.

According to an embodiment of the present invention, in case the decoding device 200 and the display device 300 of the receiving system are implemented as separate bodies, each of the decoding device 200 and the display device 300 uses a digital interface in order to transmit and/or receive data.

Examples of the digital interface may include a digital visual interface (DVI), a high definition multimedia interface (HDMI), and so on. The description of the present invention introduces a method of using the HDMI as the digital interface according to the embodiment of the present invention. In order to do so, the decoding device 200 and the display device 300 are interconnected through an HDMI cable. The HDMI transmits digital video signals and digital audio signals at a bandwidth equal to or greater than 5 Gbps.

Figure 6:
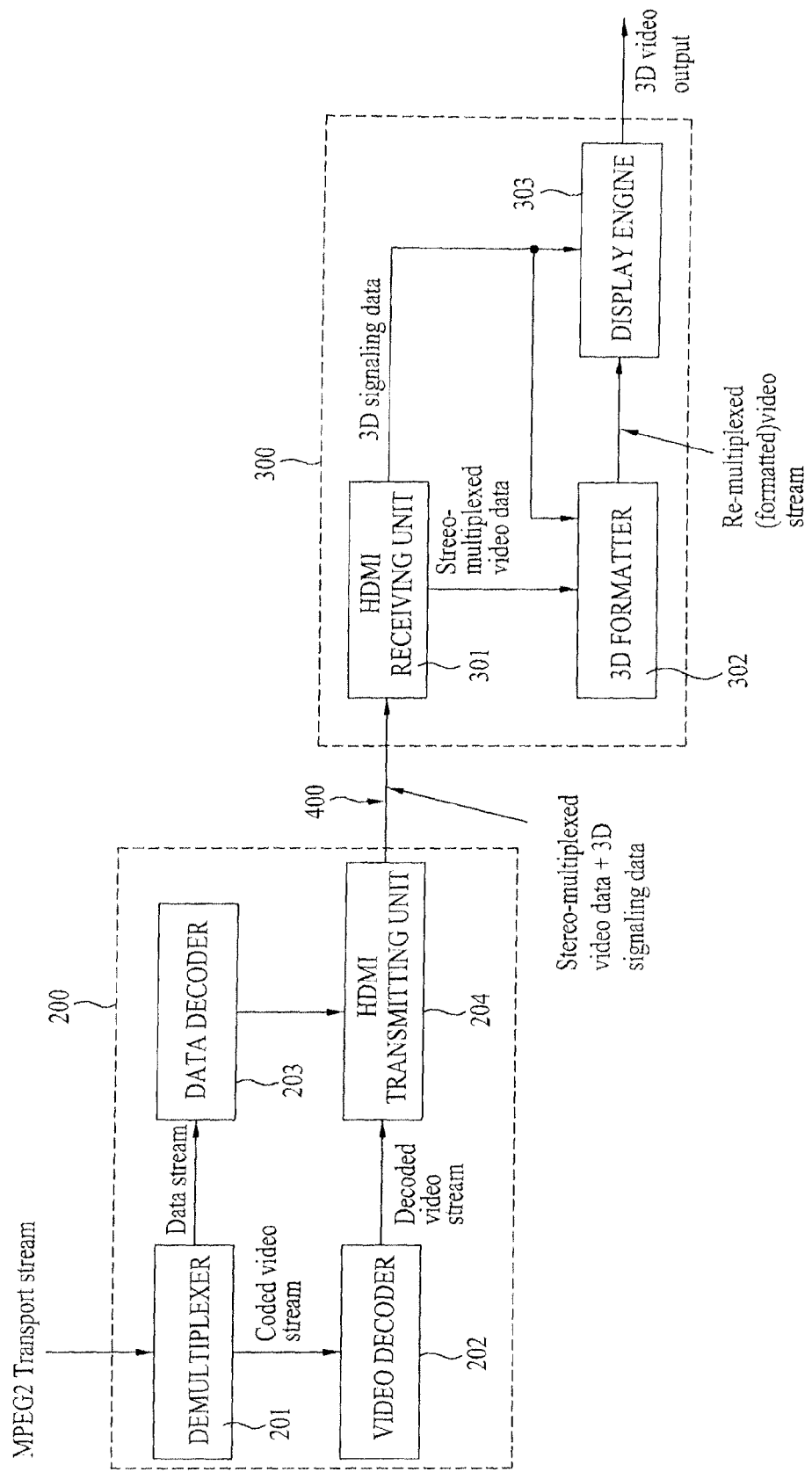
FIG. 6 illustrates a block view showing an exemplary structure of a decoding device and a display device being interconnected by an HDMI cable within the receiving system according to the present invention.

FIG. 6 illustrates a block view showing an exemplary structure of the decoding device 200 and the display device 300 of the receiving system according to the present invention being interconnected through an HDMI cable 400.

When the decoding device 200 and the display device 300 are interconnected through the HDMI cable 400, the decoding device 200 will be referred to as an HDMI source, and the display device 300 will be referred to as an HDMI sink. According to the embodiment of the present invention, the HDMI source corresponds to a settop box. Additionally, in the description of the present invention, the decoding device 200 may also be referred to as an image receiving unit, and the display device 300 may also be referred to as a display unit.

Referring to FIG. 6, the HDMI source 200 includes a demultiplexer 201, a video decoder 202, a data decoder 203, and an HDMI transmitter 204.

The HDMI sink 300 includes an HDMI receiving unit 301, a 3D formatter 302, and a display engine 303.

In the present invention, it is assumed that an MPEG-2 transport stream (TS) packet received from the content source 100 and being demodulated is inputted to the demultiplexer 201. Herein, the demodulated TS packet may correspond to a TS packet of a 2D image or a TS packet of a 3D image.

The demultiplexer 201 receives the TS packet so as to perform demultiplexing. The TS packet comprises a header and a payload. Herein, the header includes a PID, and the payload includes one of a video stream, an audio stream, and a data stream. The demultiplexer 201 uses the PID of the TS Packet being inputted so as to separate the video stream, the audio stream, and the data stream from the corresponding TS packet. The separated video stream is outputted to the video decoder 202, and the data stream including the system information is outputted to the data decoder 203. The separated audio stream is outputted to the audio decoder. However, since the audio decoder does not correspond to one of the characteristics of the present invention, detailed description of the audio decoder will be omitted for simplicity.

The video decoder 202 performs decoding on the video stream based upon a pre-determined video decoding algorithm, thereby recovering the received video stream to the initial video stream prior to compression. Examples of the video decoding algorithm includes an MPEG-2 video decoding algorithm, an MPEG-4 video decoding algorithm, an H.264 decoding algorithm, an SVC decoding algorithm, a VC-1 decoding algorithm, and so on. Since it is assumed in the present invention that the video stream is MPEG-2 compression-encoded, the video decoder 202 uses the MPEG-2 video decoding algorithm.

The video stream decoded by the video decoder 202 is then outputted to the HDMI transmitting unit 204.

The data decoder 203 uses a table_id and a section_length of the system information so as to identify various tables. Then, the data decoder 203 parses sections of the identified tables. Thereafter, the data decoder 203 either stores the parsed result in a storage device as database or outputs the parsed result to the HDMI transmitting unit 204. For example, the data decoder 203 may group (or collect) sections having the same table identifier (table_id), so as to configure a table.

Furthermore, among the tables identified from the system information, the data decoder 203 parses the stereoscopic video format descriptor from the PMT, thereby outputting the parsed result to the HDMI transmitting unit 204.

The HDMI transmitting unit 204 receives the decoded video stream and performs transition minimized differential signaling interface (TMDS)-encoding on the received decoded video stream. Subsequently, the HDMI transmitting unit 204 outputs the TDMS-encoded video stream to the HDMI receiving unit 301 of the HDMI sink 300 through the HDMI cable 400.

Moreover, the HDMI transmitting unit 204 uses the additional 3D image information acquired from the stereoscopic video format descriptor so as to generate (or convert) 3D signaling information (or 3D signaling data). Thereafter, the HDMI transmitting unit 204 outputs the generated (or converted) 3D signaling information (or 3D signaling data) to the HDMI receiving unit 301 of the HDMI sink 300 through the HDMI cable 400. More specifically, the HDMI transmitting unit 204 of the HDMI source 200 uses the TDMS channel to output TDMS-encoded video data and 3D signaling information to the HDMI receiving unit 301 of the HDMI sink 300.

Herein, the TDMS channel is used for transmitting video, audio, and supplementary data. At this point, the HDMI transmitting unit 204 uses a packet structure in order to transmit the supplementary data.

FIG. 7 illustrates a table showing examples of diverse packet types used in an HDMI standard according to the present invention.

Referring to FIG. 7, when the packet type value is equal to '0×82', this indicates that the packet structure corresponds to an auxiliary video information (AVI) InfoFrame.

According to an embodiment of the present invention, the 3D signaling information is included in the AVI InfoFrame so as to be transmitted to the HDMI sink 300.

More specifically, in order to receive and/or transmit data to and from the HDMI source 200 and the HDMI sink 300, the link of the HDMI may be broadly divided into a video data period, a data island period, and a control period.

During the video data period, active pixels of an active video line are transmitted. And, during the data island period, audio and supplemental data are transmitted through a series of packets. The control period is used when the video, audio, and supplemental data are not required to be transmitted.

According to the embodiment of the present invention, the HDMI transmitting unit 204 of the HDMI source 200 outputs an AVI InfoFrame packet including the 3D signaling information to the HDMI receiving unit 301 of the HDMI sink 300 based upon the data island period.

Herein, the AVI InfoFrame packet configured of a header region and a contents region.

FIG. 8 illustrates an exemplary header structure of an AVI InfoFrame packet according to the embodiment of the present invention. In the example shown in FIG. 8, the header structure of the AVI InfoFrame packet is configured of 3 bytes. Herein, the 1$^{st}$ byte (HB0) indicates the packet type, the 2$^{nd}$ byte (HB1) indicates the version information, and the lower 5 bits of the 3$^{rd}$ byte (HB2) indicate the contents length of the AVI InfoFrame packet in byte units.

The packet type value '0×82' is indicated in the 1$^{st}$ byte (HB0) configuring the header of the AVI InfoFrame packet according to the present invention.

FIG. 9 illustrates a contents structure of a general AVI InfoFrame packet according to the embodiment of the present invention. Herein, the 3$^{rd}$ byte (HB2) within the header of the AVI InfoFrame packet is marked to have a contents length value of '0×0D' (i.e., '13' in decimal numbers).

Additional video information are included in the 1$^{st}$ byte (PB0) to the 14$^{th}$ byte (PB13) of the AVI InfoFrame packet contents of FIG. 9. For example, bar information is recorded in the 7$^{th}$ byte (PB6) to the 14$^{th}$ byte (PB13).

In the AVI InfoFrame packet contents of FIG. 9, the region starting from the 15$^{th}$ byte (PB14) to the 28$^{th}$ byte (PM27) corresponds to an unused region.

According to the embodiment of the present invention, the present invention uses one of the unused bytes of the AVI InfoFrame packet contents shown in FIG. 9, so as to record the 3D signaling information.

According to the embodiment of the present invention, the present invention uses the 15$^{th}$ byte (PB14) to record the 3D signaling information.

At this point, the contents length value in the AVI InfoFrame packet header of FIG. 8 is modified to '0×0E' (i.e., '14' in decimal numbers).

FIG. 10 illustrates a content structure of an AVI InfoFrame packet according to the embodiment of the present invention.

Referring to FIG. 10, additional video information are marked from the 1$^{st}$ byte (PB0) to the 14$^{th}$ byte (PB13) of the AVI InfoFrame packet contents, and 3D signaling information according to the present invention is marked (or recorded) in the 15$^{th}$ byte (PB14). Furthermore, the region starting from the 16$^{th}$ byte (PB15) to the 28$^{th}$ byte (PM27) corresponds to an unused region reserved for future usage.

Herein, according to the embodiment of the present invention, the 3D signaling information being marked in the 15$^{th}$ byte (PB14) is generated (or created) based upon the additional 3D image information acquired from the stereoscopic video format descriptor included and received in the PMT.

The HDMI transmitting unit 204 allocates (or assigns) a 1-bit SV field, a 3-bit CT field (CT2 to CT0), a 1-bit OR field, a 2-bit FL field (FL1 and FL0), and a 1-bit QS field to the 15$^{th}$ byte (PB14) region, so as to mark (or indicate) the 3D signaling information.

More specifically, the 3D signaling information is generated by using the additional 3D image information acquired from a service_type field, a composition_type field, an LR_first_flag field, a spatial_flipping_flag field, an image0_flipped_flag field, and a quincunx_filtering_flag field of the stereoscopic video format descriptor.

For example, the HDMI transmitting unit 204 indicates (or marks) the information obtained from the service_type field in the SV field, indicates the information obtained from the composition_type field in the CT field, and indicates the information obtained from the LR_first_flag field in the OR field. Also, the HDMI transmitting unit 204 indicates the information obtained from the spatial_flipping_flag field and the image0_flipped_flag field in the FL field, and indicates the information obtained from the quincunx_filtering_flag field in the QS field.

(a) to (e) of FIG. 11 respectively illustrate a set of tables indicating the meaning (or definition) of the values assigned to each field within the 15$^{th}$ byte (PB14) of the AVI InfoFrame packet according to the embodiment of the present invention.

More specifically, (a) of FIG. 11 illustrates an example of the SV field. Herein, according to the embodiment of the present invention, when the service_type field value indicates a 2D image, the SV field indicates '0'. And, when the service_type field value indicates a 3D image, the SV field indicates '1'.

(b) of FIG. 11 illustrates an example of the CT field. Herein, when the SV field indicates a 3D image, the transmission format acquired from the composition_type field is indicated in the CT field. For example, when the transmission format corresponds to the top/bottom format, the CT field indicates '000'. Alternatively, when the transmission format corresponds to the side-by-side format, the CT field indicates '001'.

(c) of FIG. 11 illustrates an example of the OR field. When the LR_first_flag field indicates that the uppermost pixel of the left-end portion within the frame corresponds to the left image, the OR field indicates '0'. And, when the LR_first_flag field indicates that the uppermost pixel of the left-end portion within the frame corresponds to the right image, the OR field indicates '1'.

(d) of FIG. 11 illustrates an example of the FL field. Herein, the FL field may be determined by using the spatial_flipping_flag field value and the image0_flipped_flag field value.

For example, when the spatial_flipping_flag field value is '0', i.e., when it is indicated that the right image and the left image are both scanned and encoded in their original orders, the upper bit (FL1) of the FL field is marked as '1'. Conversely, when the spatial_flipping_flag field value is '1', i.e., when it is indicated that at least one of the right image and the left image is inversely scanned and encoded, the upper bit (FL1) of the FL field is marked as '0'. At this point, when image1 is flipped, the lower bit (FL0) of the FL field is marked as '0'. Alternatively, when image0 is flipped, the lower bit (FL0) of the FL field is marked as '1'.

(e) of FIG. 11 illustrates an example of the QS field. According to the embodiment of the present invention, when the quincunx_filtering_flag field value does not indicate the usage of the filter, the QS field indicates '0'. And, when the quincunx_filtering_flag field value indicates the usage of the filter, the QS field indicates '1'.

As described above, the AVI InfoFrame packet having the 3D signaling information recorded therein is transmitted to the HDMI receiving unit 301 of the HDMI sink 300 through the HDMI cable 400 along with the decoded video data.

The HDMI receiving unit 301 outputs the received video data to the 3D formatter 302 and parses each field of the 15$^{th}$ byte (PB14) within the AVI InfoFrame packet contents, thereby acquiring the 3D signaling information. The acquired 3D signaling information is then outputted to the 3D formatter 302 and the display engine 303. More specifically, when each field of the 15$^{th}$ byte (PB14) within the AVI InfoFrame packet contents is parsed, the HDMI receiving unit 301 may be able to determine (or know) whether the received video data correspond to a 2D image or to a 3D image. Also, if the received video data correspond to a 3D image, the HDMI receiving unit 301 may be able to determine (or know) the transmission format. Furthermore, the HDMI receiving unit 301 may also be able to determine (or know) whether the uppermost pixel of the left-end portion within the frame of the received 3D image belongs to the left image or to the right image, whether at least one of the left image and the right image has been inversely scanned and encoded, and which of the left image and the right image has been inversely scanned. Finally, the HDMI receiving unit 301 may also be able to determine (or know) whether at least one of the left image and the right image has been sampled by using a filter.

The 3D formatter 302 refers to the 3D signaling information outputted from the HDMI receiving unit 301, in order to re-format the video data outputted from the HDMI receiving unit 301, so that the re-formatted video data can fit the display format of the HDMI sink 300, thereby displaying the re-formatted video data to the display engine 303. The display engine 303 displays the 3D image outputted from the 3D formatter 302 in accordance with its display method. More specifically, the display engine 303 creates a 3D image through diverse methods using a left image and a right image based upon the display characteristics of the HDMI sink, thereby displaying the created 3D image. As described above, the display methods include a method of wearing special viewing glasses and a method of not wearing any special viewing glasses.

For example, it is assumed that the SV field value acquired from the 15$^{th}$ byte (PB14) within the AVI InfoFrame packet contents indicates that the corresponding video data is a 3D image, that the CT field value indicates that the transmission format is a side-by-side format, that the OR field value indicates '0', that the FL field value indicates '11', and that the QS field value indicates '1'. In this case, it can be determined that the uppermost pixel of the left-end portion within the received video data frame belongs to the left image, that the right image has been inversely scanned during the encoding process, and that a quincunx filter has been used when sampling the left image and the right image. Accordingly, among the video data, the 3D formatter 302 scans the right image in an inverse direction and decodes the inversely scanned right image. At this point, by performing an inverse process of the quincunx filter or an adequate inverse-filtering process, the corresponding image may be recovered to its original (or initial) size. The display engine 303 displays the image having the left-half of the pixels within a single frame decoded and being recovered, as the left image. Also, the display engine 303 displays the image having the right-half of the pixels within the frame decoded and being recovered, as the right image.

FIG. 12 illustrates a flow chart showing process steps for generating 3D signaling information by acquiring additional 3D image information from the PMT from the HDMI source 200 and transmitting the generated 3D signaling information through the HDMI cable according to the embodiment of the present invention.

More specifically, the HDMI source 200 finds (or searches) a PAT having PID=0 from the inputted data stream (S401). Thereafter, the PID of the PMT is acquired from the PAT, and stream packets having the acquired PID of the PMT are grouped (or collected) so as to configure the PMT (S402). Subsequently, the additional 3D image information is acquired from the stereoscopic video format descriptor of the PMT (S403). In other words, the additional 3D image information is acquired from the service_type field, the composition_type field, the LR_first_flag field, the spatial_flipping_ flag field, the image0_flipped_flag field, and the quincunx_ filtering_flag field of the stereoscopic video format descriptor.

Furthermore, 3D signaling information is generated by using the acquired additional 3D image information. Then, after recording the generated 3D signaling information in the 15$^{th}$ byte (PB14) of the AVI InfoFrame packet contents, the 3D signaling information is outputted to the HDMI sink 300 through the HDMI cable 400 (S404). According to the embodiment of the present invention, the information obtained (or acquired) from the service_type field is marked (or indicated) in the SV field of the 15$^{th}$ byte (PB14) of the AVI InfoFrame packet contents. The information obtained from the composition_type field is indicated in the CT field. And, the information obtained from the LR_first flag field is marked in the OR field. Also, the information obtained from the spatial_flipping_flag field and the image0_flipped_flag field is indicated in the FL field, and the information obtained from the quincunx_filtering_flag field is marked in the QS field.

FIG. 13 illustrates a flow chart showing process steps of receiving video data and 3D signaling information from the HDMI sink 300 through the HDMI cable and displaying the received video data and 3D signaling information for processing video data according to the embodiment of the present invention. More specifically, the video data and the AVI InfoFrame packet are received through the HDMI cable 400 (S501). Then, 3D signaling information is obtained from the 15$^{th}$ byte (PB14) of the AVI InfoFrame packet. The video data are re-formatted to fit the display format of the HDMI sink 300 based upon the obtained 3D signaling information (S502). Thereafter, a 3D image is created through diverse methods by using the left image and the right image of the re-formatted video data, thereby being displayed (S503).

As described above, when a decoding device and a display device are interconnected through an HDMI cable, additional 3D image information is obtained from a PMT being received by the decoding device, so as to create 3D signaling information from the obtained additional 3D image information. Subsequently, the created 3D signaling information is inserted in the AVI InfoFrame packet, thereby outputted to the display device through the HDMI cable. Thus, the display device may be able to accurately recover the 3D image and display the recovered 3D image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a 3 dimensional, 3D, broadcast service in a digital broadcast receiver, the method comprising:

receiving a broadcast signal including 3D broadcast service data and service information for signaling the 3D broadcast service data, wherein the service information includes first information indicating at least one transmission format of the 3D broadcast service among transmission formats including a side-by-side format and a top-and-bottom format, second information indicating whether the uppermost pixel of the furthermost left side of a frame belongs to a left image or a right image, third information indicating whether one of the left image and the right image of the 3D broadcast service has been inversely scanned, and fourth information specifying which one among the left image and the right image is flipped;

decoding the 3D broadcast service data and the service information;

Transition Minimized Differential Signaling, TMDS, coding the decoded 3D broadcast service data and generating an InfoFrame packet for signaling the TMDS coded 3D broadcast service data using the service information;

transmitting the TMDS coded 3D broadcast service data and the generated InfoFrame packet to a display unit, wherein the InfoFrame packet includes a first field having information derived from the first information, a second field having information derived from the second information, a third field having information derived from the third information, and a fourth field having information derived from the fourth information.

2. The method of claim 1, wherein the first information is included in a program map table, PMT, of the service information.

3. The method of claim 1, wherein the transmission formats further includes a interlaced format which corresponds to a case where a left image and a right image of the 3D broadcast service are ½ sub-sampled in a horizontal direction, and pixels of the sampled left image and pixels of the sampled right image are alternated line by line.

4. The method of claim 1, wherein the generated InfoFrame packet corresponds to an Auxiliary Video Information, AVI, InfoFrame packet.

5. The method of claim 4, wherein the AVI InfoFrame packet comprises a header and a contents region, and wherein one or more fields are assigned to at least one byte of the contents region, thereby recording signaling information for the 3D broadcast service data.

6. The method of claim 1, wherein the service information further includes fifth information indicating whether the 3D broadcast service data is being received, and the InfoFrame packet further includes a fifth field having information derived from the fifth information.

7. An apparatus for receiving a 3 dimensional, 3D, broadcast service, the apparatus comprising:

receiving unit configured to receive a broadcast signal including 3D broadcast service data and service information for signaling the 3D broadcast service data, wherein the service information includes first information indicating at least one transmission format of the 3D broadcast service among transmission formats including a side-by-side format and a top-and-bottom format, second information indicating whether the uppermost pixel of the furthermost left side of a frame belongs to a left image or a right image, third information indicating whether one of the left image and the right image of the 3D broadcast service has been inversely scanned, and fourth information specifying which one among the left image and the right image is flipped;

decoding unit configured to decode the 3D broadcast service data and the service information;

conversion unit configured to Transition Minimized Differential Signaling, TMDS, code the decoded 3D broadcast service data and generate an InfoFrame packet for signaling the TMDS coded 3D broadcast service data using the service information;

transmission unit configured to transmit the TMDS coded 3D broadcast service data and the generated InfoFrame packet to a display unit, wherein the InfoFrame packet includes a first field having information derived from the first information, a second field having information derived from the second information, a third field having information derived from the third information, and a fourth field having information derived from the fourth information.

8. The apparatus of claim 7, wherein the first information is included in a program map table, PMT, of the service information.

9. The apparatus of claim 7, wherein the transmission formats further includes a interlaced format which corresponds to a case where a left image and a right image of the 3D broadcast service are ½ sub-sampled in a horizontal direction, and pixels of the sampled left image and pixels of the sampled right image are alternated line by line.

10. The apparatus of claim 7, wherein the generated InfoFrame packet corresponds to an Auxiliary Video Information, AVI, InfoFrame packet.

11. The apparatus of claim 10, wherein the AVI InfoFrame packet comprises a header and a contents region, and wherein one or more fields are assigned to at least one byte of the contents region, thereby recording signaling information for the 3D broadcast service data.

12. The apparatus of claim 7, wherein the service information further includes fifth information indicating whether the 3D broadcast service data is being received, and the InfoFrame packet further includes a fifth field having information derived from the fifth information.

* * * * *